US012576683B2

(12) United States Patent
Mohan et al.

(10) Patent No.: US 12,576,683 B2
(45) Date of Patent: Mar. 17, 2026

(54) SUSPENSION DAMPING CONTROL

(71) Applicant: Rivian IP Holdings, LLC, Irvine, CA (US)

(72) Inventors: Karthik Mohan, Irvine, CA (US); Mark George Milne, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 19/205,927

(22) Filed: May 12, 2025

(65) Prior Publication Data

US 2025/0346087 A1      Nov. 13, 2025

Related U.S. Application Data

(60) Provisional application No. 63/646,630, filed on May 13, 2024.

(51) Int. Cl.
*B60G 17/018*      (2006.01)
*B60G 17/0165*      (2006.01)
*B60G 17/015*      (2006.01)

(52) U.S. Cl.
CPC ..... *B60G 17/0182* (2013.01); *B60G 17/0165* (2013.01); *B60G 17/0155* (2013.01); *B60G 2400/204* (2013.01); *B60G 2400/60* (2013.01); *B60G 2400/821* (2013.01); *B60G 2500/10* (2013.01); *B60G 2600/17* (2013.01); *B60G 2600/602* (2013.01); *B60G 2600/70* (2013.01)

(58) Field of Classification Search
CPC ............ B60G 17/0182; B60G 17/0165; B60G 17/0155; B60G 2400/204; B60G 2400/60; B60G 2400/821; B60G 2500/10; B60G 2600/17; B60G 2600/602; B60G 2600/70
See application file for complete search history.

(56) References Cited

U.S. PATENT DOCUMENTS

| | | | | |
|---|---|---|---|---|
| 6,311,110 | B1 * | 10/2001 | Ivers | F16F 15/00 |
| | | | | 280/5.515 |
| 6,633,803 | B1 * | 10/2003 | Shal | B60G 17/018 |
| | | | | 701/37 |
| 11,285,773 | B1 * | 3/2022 | Hall | B60G 17/06 |
| 11,634,000 | B2 | 4/2023 | Abdallah et al. | |
| 12,403,740 | B2 * | 9/2025 | Tan | B60G 17/0165 |

(Continued)

FOREIGN PATENT DOCUMENTS

| | | | |
|---|---|---|---|
| GB | 2525839 | A | 11/2015 |
| JP | H07186665 | A | 7/1995 |

*Primary Examiner* — Toan C To
(74) *Attorney, Agent, or Firm* — Patterson + Sheridan, LLP

(57)      ABSTRACT

A vehicle includes a suspension system having a damping system that includes a plurality of dampers and a plurality of damper valves. The vehicle further includes one or more processors configured to determine energy content of an acceleration signal indicative of acceleration of the vehicle. The one or more processors are further configured to dynamically tune a cutoff frequency of a high-pass filter based on the energy content of the acceleration signal. The one or more processors are configured to filter, via the high-pass filter, a velocity signal derived from the acceleration signal to output a filtered velocity signal. The one or more processors are configured to control operation of the damping system based on the filtered velocity signal.

20 Claims, 10 Drawing Sheets

(56)    References Cited

U.S. PATENT DOCUMENTS

| | | | | |
|---|---|---|---|---|
| 2005/0096799 | A1 | 5/2005 | Boswell et al. | |
| 2008/0009992 | A1 | 1/2008 | Izawa et al. | |
| 2008/0082235 | A1* | 4/2008 | Nakamura | B60G 17/056 |
| | | | | 267/140.11 |
| 2011/0035103 | A1* | 2/2011 | Arenz | B60G 17/0185 |
| | | | | 701/37 |
| 2015/0066295 | A1* | 3/2015 | Kanda | B60G 17/01933 |
| | | | | 701/38 |
| 2015/0105979 | A1* | 4/2015 | Hilderband | B60G 17/0162 |
| | | | | 701/38 |
| 2015/0224845 | A1* | 8/2015 | Anderson | B60G 17/052 |
| | | | | 701/37 |
| 2016/0107498 | A1 | 4/2016 | Yamazaki | |
| 2016/0159188 | A1* | 6/2016 | Mohamed | F16F 15/002 |
| | | | | 701/37 |
| 2018/0178856 | A1* | 6/2018 | Davis | B62D 33/0608 |
| 2018/0319237 | A1 | 11/2018 | Unger | |
| 2020/0156430 | A1* | 5/2020 | Oakden-Graus | B60G 17/06 |
| 2020/0317018 | A1* | 10/2020 | Nong | G05D 1/027 |
| 2021/0354523 | A1* | 11/2021 | Hirao | B60G 17/015 |
| 2023/0086480 | A1* | 3/2023 | Tan | B60G 17/0162 |
| | | | | 701/37 |

* cited by examiner

400

600

800

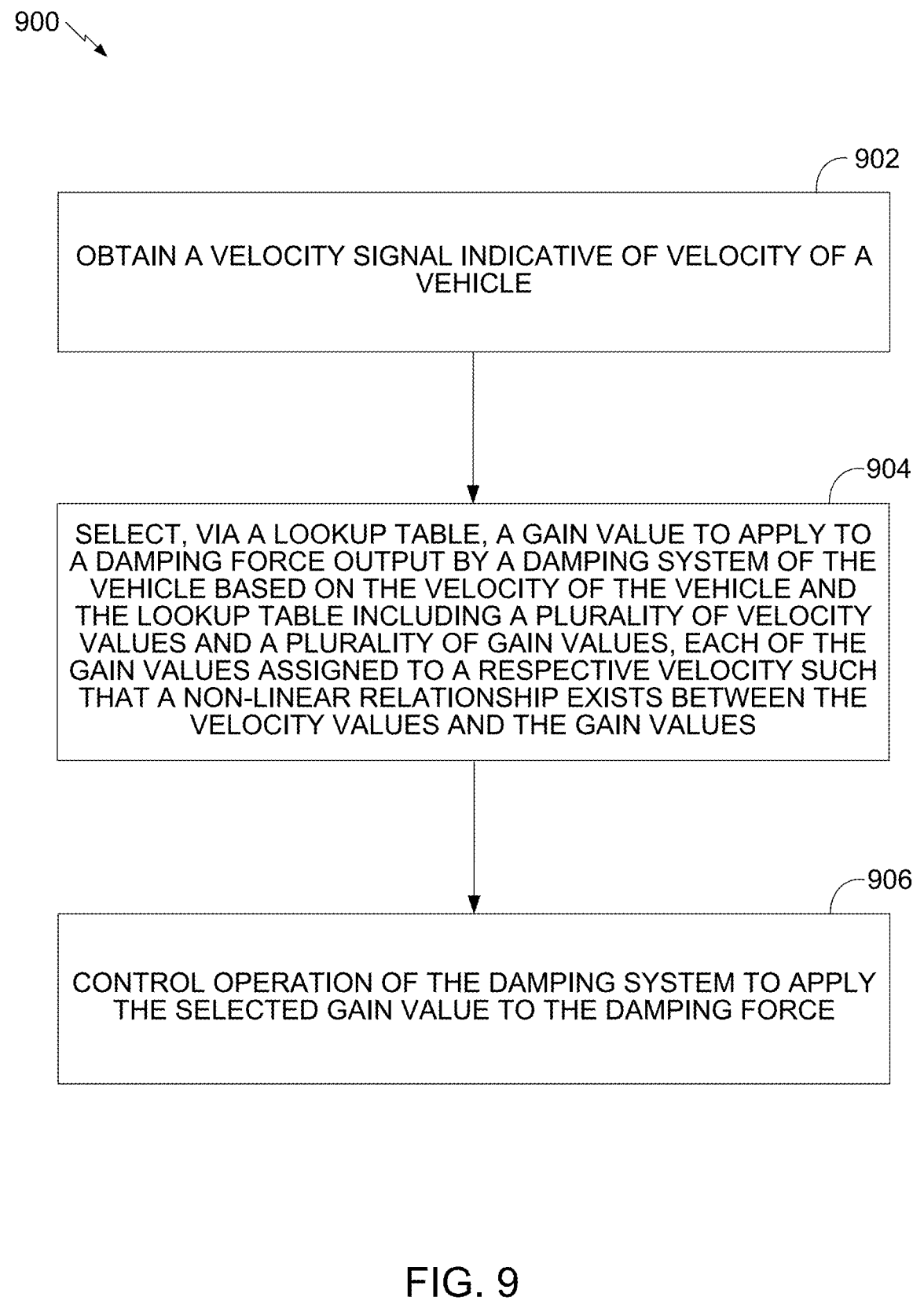

900

902

OBTAIN A VELOCITY SIGNAL INDICATIVE OF VELOCITY OF A VEHICLE

904

SELECT, VIA A LOOKUP TABLE, A GAIN VALUE TO APPLY TO A DAMPING FORCE OUTPUT BY A DAMPING SYSTEM OF THE VEHICLE BASED ON THE VELOCITY OF THE VEHICLE AND THE LOOKUP TABLE INCLUDING A PLURALITY OF VELOCITY VALUES AND A PLURALITY OF GAIN VALUES, EACH OF THE GAIN VALUES ASSIGNED TO A RESPECTIVE VELOCITY SUCH THAT A NON-LINEAR RELATIONSHIP EXISTS BETWEEN THE VELOCITY VALUES AND THE GAIN VALUES

906

CONTROL OPERATION OF THE DAMPING SYSTEM TO APPLY THE SELECTED GAIN VALUE TO THE DAMPING FORCE

FIG. 9

SUSPENSION DAMPING CONTROL

CROSS-REFERENCE TO RELATED APPLICATION

This application claims the benefit of U.S. Provisional Ser. No. 63/646,630 filed on May 13, 2024, which is assigned to the assignee hereof and are hereby expressly incorporated by reference in their entirety as if fully set forth below and for all applicable purposes.

INTRODUCTION

The present disclosure relates to a vehicle suspension system, and more particularly to techniques for controlling dampers of the vehicle suspension system.

SUMMARY

In one aspect, a vehicle is provided. The vehicle includes: a suspension system having a damping system that includes a plurality of dampers and a plurality of damper valves; and one or more processors configured to: determine an energy content of the acceleration signal; dynamically tune a cutoff frequency of a high-pass filter based on the energy content of the acceleration signal; filter, via the high-pass filter, a velocity signal derived from the acceleration signal to output a filtered velocity signal; and based on the filtered velocity signal, control operation of the damping system based on the filtered velocity signal.

In another aspect, a method for dynamically filtering body velocities for a vehicle is provided. The method includes: determining energy content an acceleration signal indicative of acceleration of the vehicle; dynamically tuning a cutoff frequency of a high-pass filter based on the energy content of the acceleration signal; filtering, via the high-pass filter, a velocity signal derived from the acceleration signal to output a filtered velocity signal; and controlling operation of a damping system based on the filtered velocity signal.

In yet another aspect, a vehicle is provided. The vehicle includes: a suspension system comprising a damping system configured to output a damping force; and one or more processors configured to: obtain a velocity signal indicative of a velocity of the vehicle; select, via a lookup table, a gain value to apply to the damping force based on the velocity of the vehicle, the lookup table including a plurality of different velocity values and a plurality of different gain values, each respective gain value of the plurality of gain values assigned to a respective velocity value of the plurality of velocity values such that a non-linear relationship exists between the velocity values and the gain values; and control operation of the damping system to apply the selected gain value to the damping force.

Without limiting the scope of the present embodiments, their more prominent features will now be discussed below. After considering this discussion, and particularly after reading the section entitled "Detailed Description," one will understand how the features of the present embodiments provide the advantages described here.

BRIEF DESCRIPTION OF THE DRAWINGS

FIG. 9 illustrates a flow diagram of a method for non-linear body control of a vehicle in accordance with certain embodiments.

DETAILED DESCRIPTION

The present disclosure describes an approach for dynamically modifying vehicle suspension damping. In various embodiments, a non-linear gain is applied when performing suspension damping across a range of body velocities. Additionally, velocities of the body (e.g., chassis) of a vehicle may be filtered by implementing a dynamic filter cut-off that varies based on, for example, the root mean square (RMS) of raw (e.g., unprocessed) acceleration data (e.g., received from an inertial measurement unit (IMU)). Further, the energy content of sprung and un-sprung masses can be implemented to determine and compensate for road surface characteristics (e.g., smooth, rough, undulating, etc.). In various embodiments, estimates of axle masses can be determined (e.g., based on air-spring pressures) to perform load-compensated suspension damping and load-compensated body control for various drive modes and/or loading conditions.

Figure 1A:
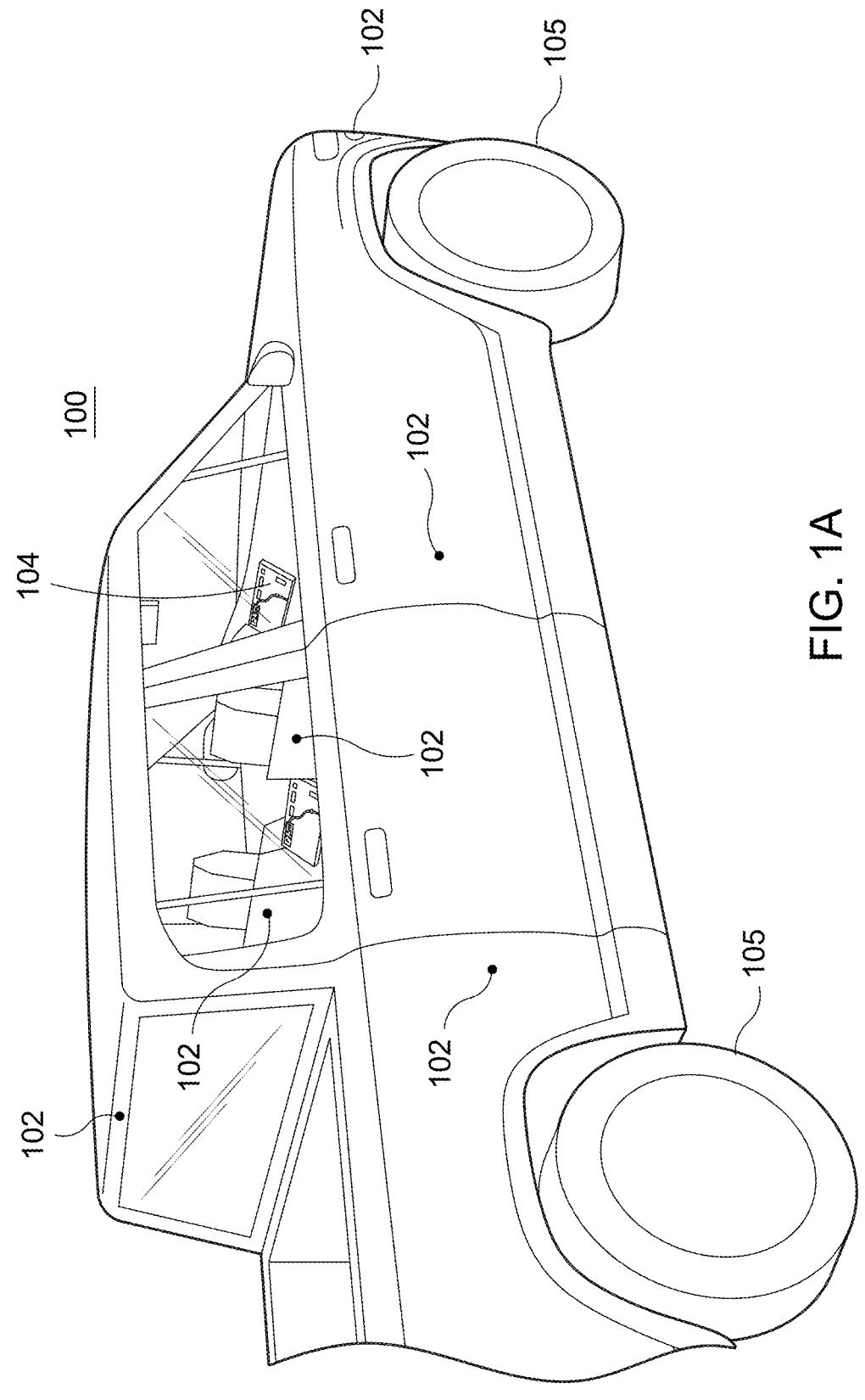
FIG. 1A illustrates an example vehicle that may be operated in accordance with certain embodiments.

FIG. 1A illustrates an example vehicle 100 in which the approaches described herein may be implemented. As seen in FIG. 1A, the vehicle 100 has multiple exterior cameras 102 and one or more front displays 104. Each of these exterior cameras 102 may capture a particular view or perspective on the outside of the vehicle 100. The images or videos captured by the exterior cameras 102 may then be presented on one or more displays in the vehicle 100, such as the one or more front displays 104, for viewing by a driver. The vehicle 100 further includes a plurality of road wheels 105, such as four, that are driven to propel the vehicle 100 over a surface.

Figure 1B:
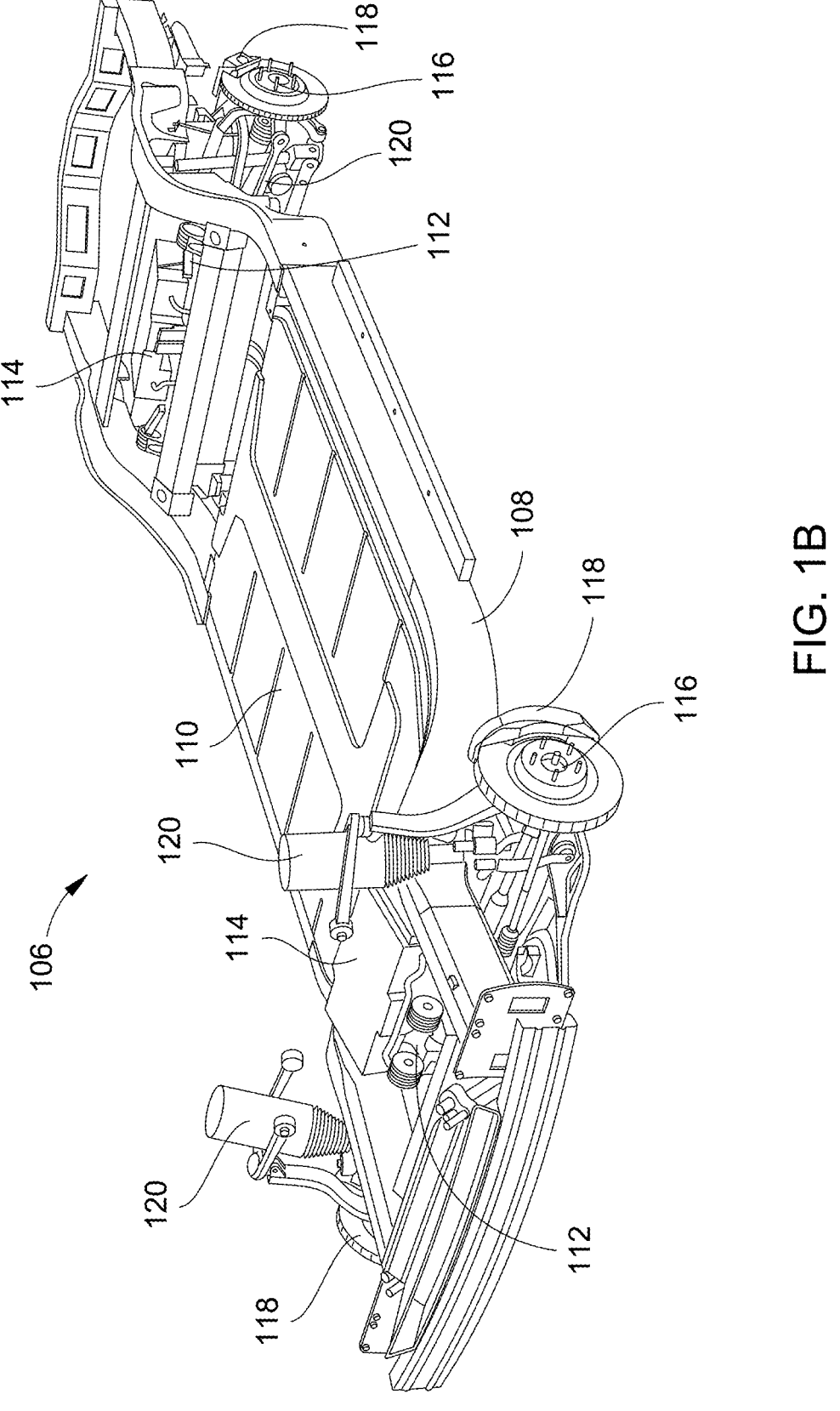
FIG. 1B illustrates a chassis of a vehicle having multiple drive units that may be operated in accordance with certain embodiments.

Referring to FIG. 1B, the vehicle 100 may include a chassis 106 including a frame 108 providing a primary structural member of the vehicle 100. The frame 108 may be formed of one or more beams or other structural members or may be integrated with the body of the vehicle 100 (i.e., unibody construction). The body of the vehicle 100 may include external body panels, windows, doors, port covers, tailgates, liftgates, etc.

In embodiments where the vehicle 100 is a battery electric vehicle (BEV) or possibly a hybrid vehicle, a large battery 110 is mounted to the chassis 106 and may occupy a substantial (e.g., at least 80 percent) of an area within the frame 108. For example, the battery 110 may store from 100 to 200 kilowatt hours (kWh). The battery 110 may be a lithium-ion battery or other type of rechargeable battery. The battery may be substantially planar in shape.

Power from the battery 110 may be supplied to one or more drive units 112. Each drive unit 112 may be formed of an electric motor and possibly a gear train providing a gear reduction. In some embodiments, there is a single drive unit 112 driving either the front wheels or the rear wheels of the vehicle 100. In another embodiment, there are two drive units 112, each driving either the front wheels or the rear wheels of the vehicle 100. In yet another embodiment, there are four drive units 112, each drive unit 112 driving one of four wheels of the vehicle 100.

Power from the battery 110 may be supplied to the drive units 112 by one or more power modules 114, such as power electronics for each drive unit 112 or pair of drive units 112. The power modules 114 may include inverters configured to convert direct current (DC) from the battery 110 into alternating current (AC) supplied to the motors of the drive units 112. The power modules 114 further facilitate operation of the motors of the drive units as generators to provide regenerative braking. The power modules 114 further facilitate the transfer of regenerative current to the battery 110.

The drive units 112 are coupled to two or more hubs 116 to which road wheels 105 may mount. Each hub 116 includes a corresponding brake 118, such as the illustrated disc brakes. Each hub 116 is further coupled to the frame 108 by a suspension 120. The suspension 120 may include metal or pneumatic springs for absorbing impacts. The suspension 120 may be implemented as a pneumatic or hydraulic suspension capable of adjusting a ride height of the chassis 106 relative to a support surface. The suspension 120 may include a damper with the properties of the damper being either fixed or adjustable electronically.

In the embodiment of FIG. 1B and in the discussion below, the vehicle 100 is a battery electric vehicle. However, an internal combustion engine (ICE) vehicle or hybrid-electric vehicle may also benefit from the approach described herein.

Figure 2:
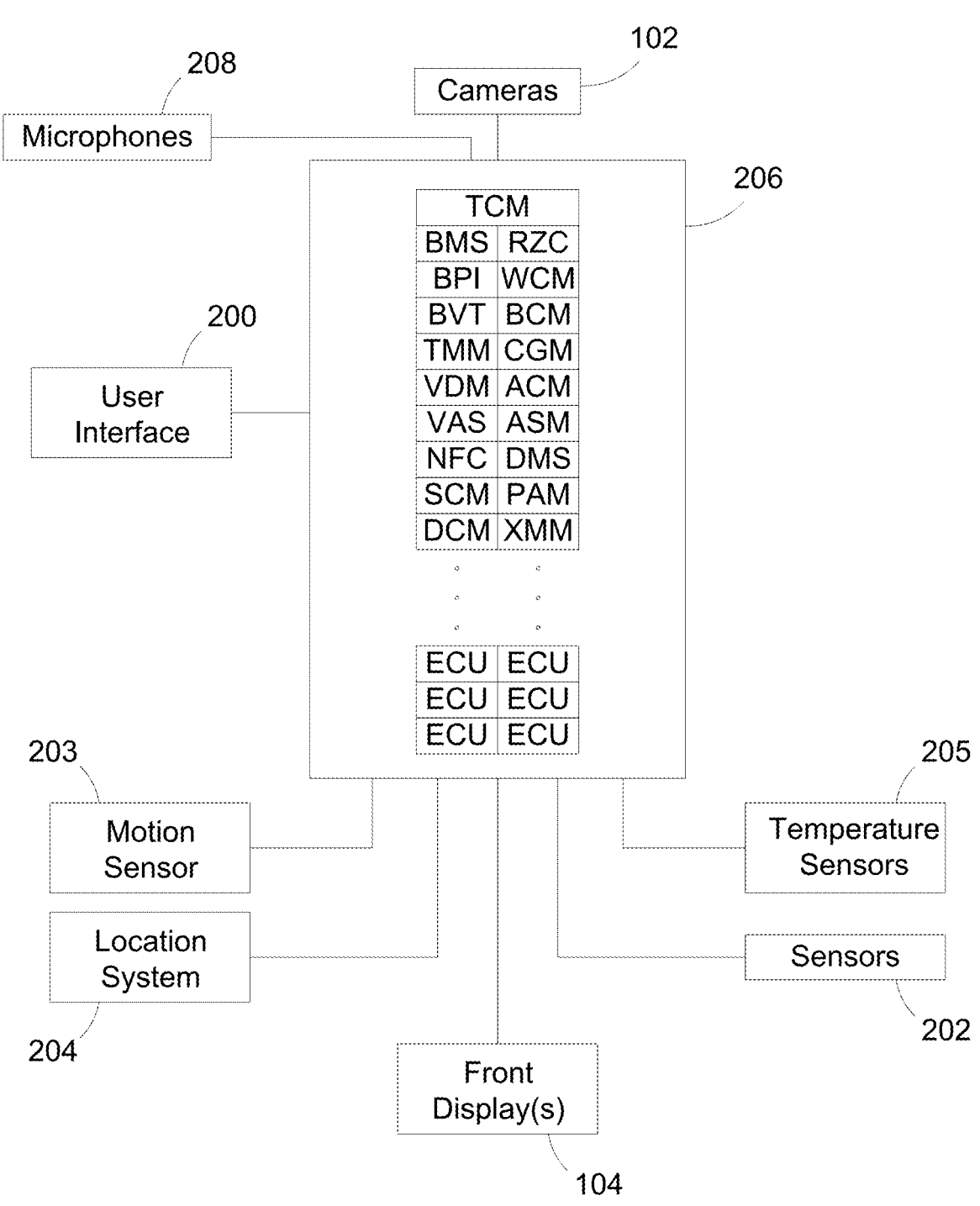
FIG. 2 is a schematic block diagram of components for operating the vehicle in accordance with certain embodiments.

FIG. 2 illustrates example components of the vehicle 100 of FIG. 1A. As seen in FIG. 2, the vehicle 100 includes the cameras 102, the one or more front displays 104, a user interface 200, one or more sensors 202, a motion sensor 204, and a location system 206. The one or more sensors 202 may include ultrasonic sensors, radio detection and ranging (RADAR) sensors, light detection and ranging (LIDAR) sensors, or other types of sensors. The location system 206 may be implemented as a global positioning system (GPS) receiver. The user interface 200 allows a user, such as a driver or passenger in the vehicle 100, to provide input.

The components of the vehicle 100 may include one or more temperature sensors 208. The temperature sensors 208 may include sensors configured to sense an ambient air temperature, temperature of the battery 110, temperature of power electronics 114, temperature of each drive unit 112 and/or each motor of each drive unit 112, temperature of coolant fluid entering or leaving a coolant system, temperature of oil within a drive unit 112, or the temperature of any other component of the vehicle 100. The temperature sensors 208 may include a temperature sensor directly mounted to a microprocessor of the power electronics 114.

A control system 214 executes instructions to perform at least some of the actions or functions of the vehicle 100. For example, as shown in FIG. 2, the control system 214 may include one or more electronic control units (ECUs) configured to perform at least some of the actions or functions of the vehicle 100, including the functions described in relation to FIGS. 3 to 6F. In certain embodiments, each of the ECUs is dedicated to a specific set of functions.

Certain features of the embodiments described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device, in-vehicle navigation, vehicle-to-vehicle communication, communication between the vehicle and landscape features (e.g., automated toll road sensors, automated toll gates, power dispensers at charging stations), or automated calling functionality.

Certain features of the embodiments described herein may be controlled by a Central Gateway Module (CGM) ECU. The CGM ECU may serve as the vehicle's communications hub that connects and transfer data to and from the various ECUs, sensors, cameras, microphones, motors, displays, and other vehicle components. The CGM ECU may include a network switch that provides connectivity through Controller Area Network (CAN) ports, Local Interconnect Network (LIN) ports, and Ethernet ports. The CGM ECU may also serve as the master control over the different vehicle modes (e.g., road driving mode, parked mode, off-roading mode, tow mode, camping mode), and thereby control certain vehicle components related to placing the vehicle in one of the vehicle modes.

In various embodiments, the CGM ECU collects sensor signals from one or more sensors of vehicle 100. For example, the CGM ECU may collect data from cameras 102, sensors 202, motion sensor 204, location system 206, and temperature sensors 208. The sensor signals collected by the CGM ECU are then communicated to the appropriate ECUs for processing.

The control system 214 may also include one or more additional ECUs, such as, by way of example and not limitation: a Vehicle Dynamics Module (VDM) ECU, an Experience Management Module (XMM) ECU, a Vehicle Access System (VAS) ECU, a Near-Field Communication (NFC) ECU, a Body Control Module (BCM) ECU, a Seat Control Module (SCM) ECU, a Door Control Module (DCM) ECU, a Rear Zone Control (RZC) ECU, an Autonomy Control Module (ACM) ECU, an Autonomous Safety Module (ASM) ECU, a Driver Monitoring System (DMS) ECU, and/or a Winch Control Module (WCM) ECU.

If vehicle 100 is an electric vehicle, one or more ECUs may provide functionality related to the battery pack of the vehicle, such as a Battery Management System (BMS) ECU, a Battery Power Isolation (BPI) ECU, a Balancing Voltage Temperature (BVT) ECU, and/or a Thermal Management Module (TMM) ECU. In various embodiments, the XMM ECU transmits data to the TCM ECU (e.g., via Ethernet, etc.). Additionally or alternatively, the XMM ECU may transmit other data (e.g., sound data from microphones 216, etc.) to the TCM ECU.

The control system 214 may be coupled to one or more other components of the vehicle 100 in order to control the components or determine the state of the one or more other components. For example, the control system 214 may be coupled to the suspension 120 in order to determine the state thereof or to control the configuration thereof (e.g., stiffness, ride height, damping, etc.). The control system 214 may be coupled to external lights 220 of the vehicle, such as headlights, taillights, one or more light bars, tracer lights, or other lights. The control system 214 may be coupled to one or more door sensors 222 configured to sense a state of doors, liftgates, tailgates, bed cover, hood, charge port cover, gear tunnel cover, or other access panels. The control system 214 may be coupled to mirror actuators 224 for controlling the orientation of sideview mirrors. The illustrated components 116, 220, 222, 224 are exemplary only. Any component of the vehicle that can change state may be coupled to the control system 214 such that the control system 214 can one or both of control the state of the component and sense the state of the component.

Figure 3:
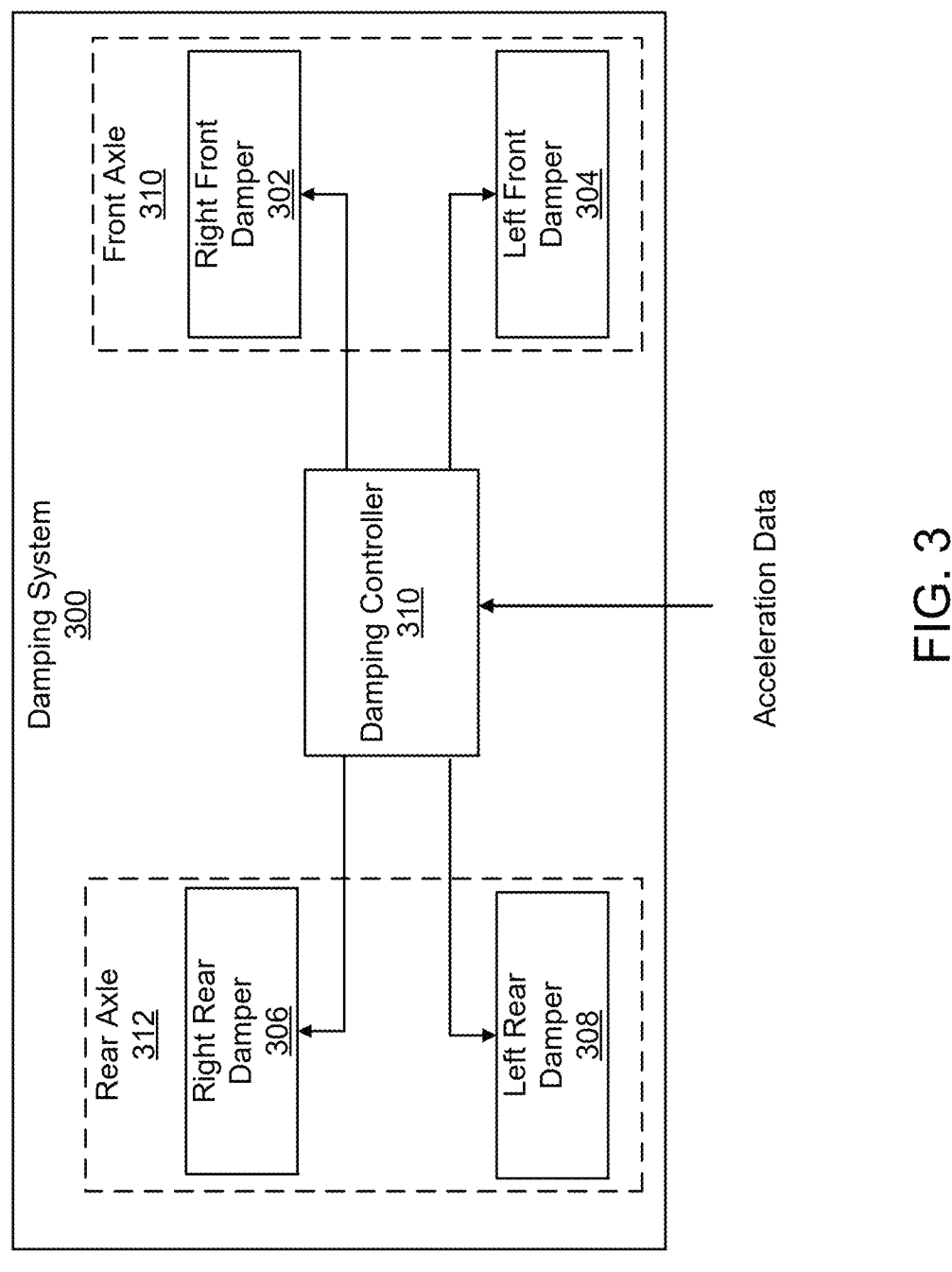
FIG. 3 is a schematic block diagram of components of a dampening system for a vehicle in accordance with certain embodiments.

FIG. 3 depicts a block diagram of components of a damping system 300 for a suspension of a vehicle according to the present disclosure.

The damping system 300 may include a plurality of dampers (e.g., shock absorbers) that may be actuated to dampen movement (e.g., oscillations) of the suspension along an axis (e.g., heave axis) that occurs, for example, due to undulations in the surface along which the vehicle is traveling. In some embodiments, the damping system 300 may include a first damper 302 (e.g., labeled "Right Front Damper") located at a right-front corner of the vehicle, a second damper 304 (e.g., labeled "Left Front Damper") located at a left-front corner of the vehicle, a third damper 306 (e.g., labeled "Right Rear Damper") located at a right-rear corner of the vehicle, and a fourth damper 308 (e.g., labeled "Left Rear Damper") located at a left-rear corner of the vehicle. In other embodiments, the damping system 300 may include more or fewer dampers.

The damping system 300 may include a damping controller 310 configured to control operation of the dampers 302, 304, 306, 308 to dampen movement of the suspension. For instance, the damping controller 310 may send control signals (e.g., current signals) to each of the dampers 302, 304, 306, 308 to control operation of same. In some embodiments, the control signals the damping controller 310 sends to the dampers 302, 304, 306, 308 may be based, at least in part, on acceleration data 312 that the damping controller 310 receives from one or more sensors onboard the vehicle and configured to sense acceleration of the vehicle.

Example aspects of the present disclosure are directed to techniques for controlling the damping system 300 to improve ride comfort of the vehicle. For example, as will be discussed with reference to FIG. 4, the damping system 300 may be controlled to apply a unique non-linear damping force based, at least in part, on a body velocity of the vehicle. Furthermore, as will be discussed with reference to FIGS. 5-7, techniques may be implemented to reduce or eliminate drift that is present in velocity signals derived from one or more sensors configured to sense body acceleration of the vehicle. By reducing or eliminating the drift in the velocity signals, the response of the damping system to various disturbances (e.g., primary ride events) may be improved compared to conventional damping systems. Still further, techniques may be implemented to control operation of the damping system based on various other attributes (e.g., road surface type, sudden acceleration, sudden braking, load compensation, etc.) to provide improved damping of the suspension of the vehicle.

Figure 4:
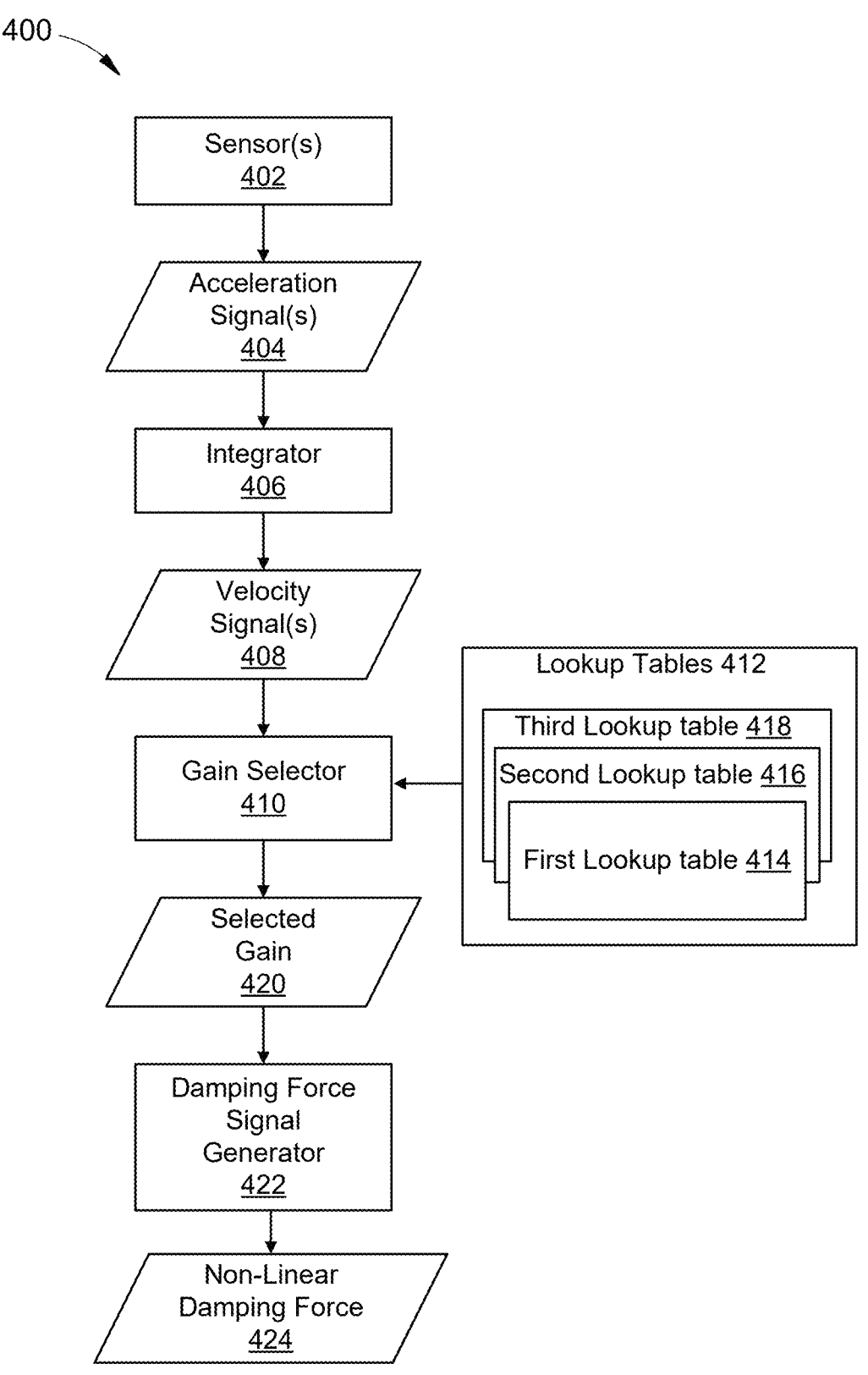
FIG. 4 illustrates a process for applying a non-linear gain when performing suspension damping across a range of body velocities in accordance with certain embodiments.

Referring now to FIG. 4, a process 400 for providing non-linear suspension damping control for a vehicle according to some embodiments of the present disclosure. For instance, the process 400 for providing non-linear suspension damping control may be implemented by the damping system 300 discussed above with reference to FIG. 3.

The process 400 may include obtaining acceleration data for the vehicle. For instance, in some embodiments, the acceleration data may include one or more acceleration signals 404 obtained from one or more sensors 402 (e.g., inertial measurement unit(s)) onboard the vehicle). The acceleration signal(s) 404 may be indicative of acceleration of the body (e.g., chassis) of the vehicle. For example, in some embodiments, the acceleration signal(s) 404 may include a first acceleration signal indicative of linear acceleration (e.g., heave acceleration) of the body of the vehicle along a first axis (e.g., vertical axis), a second acceleration signal indicative of rotational acceleration (e.g., pitch) of the body of the vehicle about a second axis (e.g., lateral axis), and a third acceleration signal indicative of rotational acceleration (e.g., roll) of the body of the vehicle about a third axis (e.g., longitudinal axis).

The process 400 may include obtaining one or more velocity signals 408 from the acceleration signal(s) 404. For instance, the process 400 may involve providing the acceleration signal(s) 404 to an integrator 406 configured to integrate the acceleration signal(s) 404 to obtain the velocity signal(s) 408. For example, the integrator 406 may integrate the first acceleration signal to obtain a first velocity signal indicative of a linear velocity of the body of the vehicle along the first axis. The integrator 406 may integrate the second acceleration signal to obtain a second velocity signal indicative of a rotational velocity of the body of the vehicle about the second axis and may integrate the third acceleration signal to obtain a third velocity signal indicative of rotational velocity of the body of the vehicle about the third axis.

The process 400 may include selecting a particular gain value to apply to an output (e.g., damping force) of the damping system based on the velocity signal(s) 408. For instance, the process may include a gain selector 410 configured to compare an attribute (e.g., magnitude) of the velocity signal(s) 408 to at least one lookup table of a plurality of different lookup tables 412. For instance, in some embodiments, the plurality of different lookup tables 412 may include a first lookup table 414 associated with a first ride mode (e.g., on road) for the vehicle, a second lookup table 416 associated with a second ride mode (e.g., off-road) for the vehicle, and a third lookup table 418 associated with a third ride mode (e.g., sport) for the vehicle. In alternative embodiments, more or fewer lookup tables may be provided.

Each of the different lookup tables 412 may include a plurality of velocity values and different gain values associated with the velocity values. For instance, each of the plurality of different lookup tables 412 may include a first range of velocity values and a first gain value to apply to the output of the damping system when the velocity value indicated by the velocity signal(s) 408 satisfies (e.g., is included within) the first range of velocity values. Furthermore, each of the plurality of different lookup tables 412 may include a second range of velocity values and a second gain value that is different from the first gain value to apply to the output of the damping system when the velocity value indicated by the velocity signal(s) 408 falls within the second range of velocity values. In this manner, each of the plurality of different lookup tables 412 may function as a shaping table that controls the output (e.g., damping force) of the damping system to account for non-linearities in the suspension of the vehicle. For example, in various embodiments, the suspension becomes stiffer as the springs of the suspension move toward an end-stop (e.g., a first end-stop associated with compression of the suspension or a second end-stop associated with rebound of the suspension) and the gain values included in the plurality of different lookup tables 412 may account for this non-linear behavior of the suspension so that the damping system may avoid over-damping when the suspension is stiffer (e.g., due to the springs thereof being closer to the end-stop). In this manner, the process 400 allows the damping system to provide improved (e.g., non-linear) damping control compared to conventional damping systems that apply a constant, linear gain to the force output (e.g., damping force) and thus do not account for non-linearities associated with the suspension or damping system of the vehicle (e.g., non-linearities due to variations in bushing rates of damping system).

In some embodiments, the plurality of velocity values included in each of the plurality of lookup tables 412 may include velocity values of different types (e.g., heave veloc-ity, pitch velocity, roll velocity) and a different gain value for each of the velocity values. Furthermore, in such embodi-ments, the total number of velocity values may vary based on the type of velocity value (e.g., heave, pitch, roll). For instance, in some embodiments, each of the plurality of lookup tables 412 may include fewer velocity values for roll velocity than for each of heave velocity and pitch velocity.

The process 400 may involve the gain selector 410 providing a selected gain 420 to a damping force signal generator 422. For instance, in some embodiments, the damping force signal generator 422 may be the damping controller (e.g., damping controller 310 of FIG. 3) of the damping system. In some embodiments, the damping force signal generator 422 may be configured to adjust an attribute (e.g., an amplitude) of a control signal (e.g. current signal) that the damping force signal generator 422 provides to one or more dampers of the damping system. In this manner, the damping force signal generator 422 may operate the damp-ers to provide a non-linear damping force 424.

The above-described process 400 for providing non-linear suspension damping control may provide improved control of body velocities (e.g. heave velocities) of the vehicle and, in doing so, may improve ride comfort of the vehicle. More specifically, by populating each of the lookup tables 412 with different gain values for different velocity values, the process 400 may provide non-linear damping of the suspen-sion of the vehicle and, in doing so, may avoid overdamping of the suspension in certain situations, such as when the suspension is stiffer (e.g., due to springs thereof approaching an end-stop) and therefore needs less damping.

Figure 5:
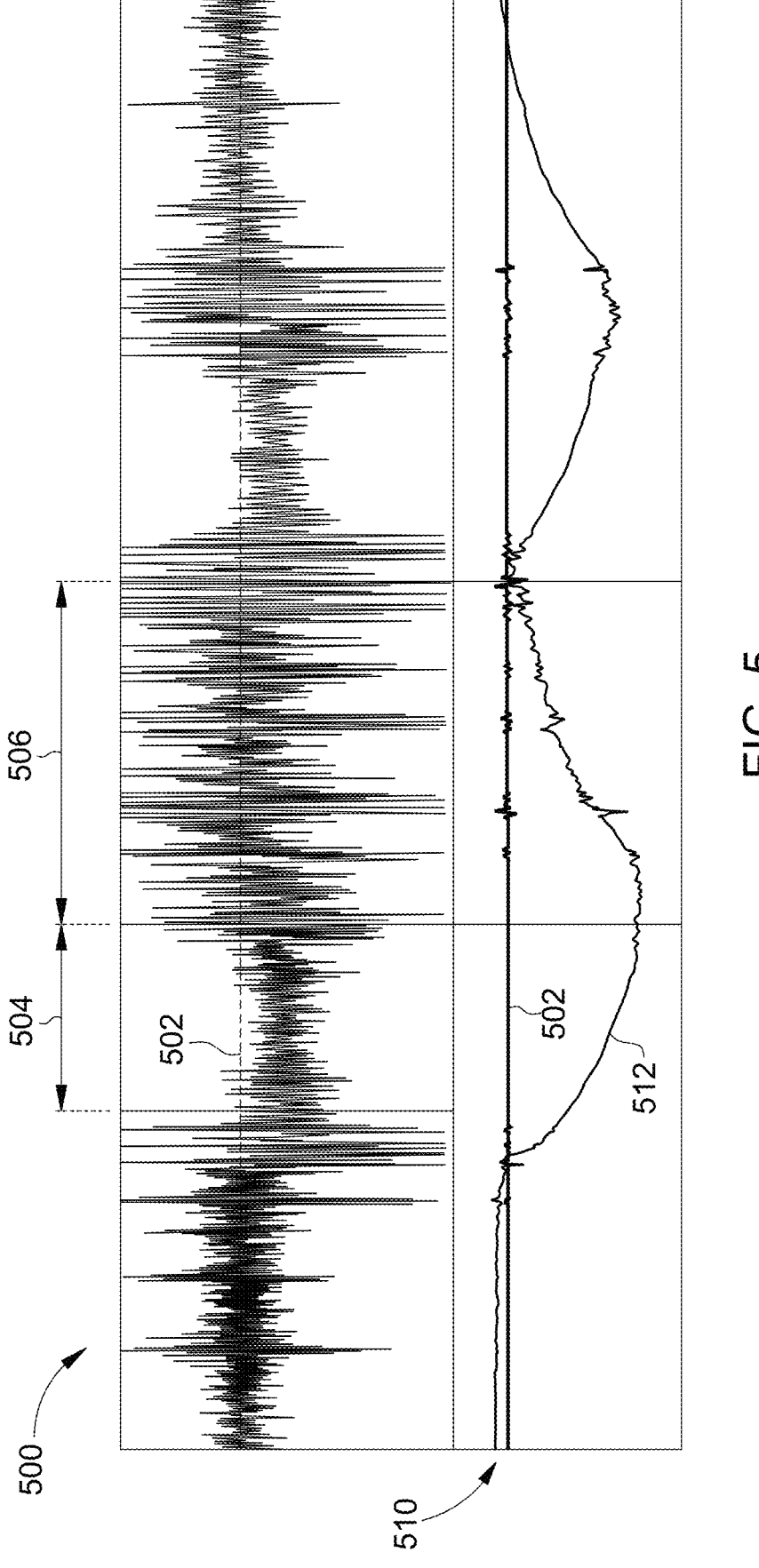
FIG. 5 illustrates graphs depicting drift in an acceleration signal and its impact on a velocity signal derived from the acceleration signal in accordance with certain embodiments.

Referring now to FIG. 5, graph 500 illustrates drift in an acceleration signal according to some embodiments of the present disclosure. In the example of FIG. 5, the acceleration signal is output by a sensor (e.g., IMU) onboard a vehicle while the vehicle is parked on a ramp, such as a loading dock. The graph 500 illustrates that the acceleration signal drifts from actual zero 502 during a first interval of time 504. The graph 500 further illustrates that the acceleration signal eventually returns to actual zero 502 during a second inter-val of time 506 following the first interval of time 504. The drift present in the acceleration signal is due, at least in part, to the sensor (e.g., IMU) being an imperfect sensor. Fur-thermore, for this particular example, the drift in the accel-eration signal may be attributed to the vehicle being parked on a sloped surface (e.g., a ramp).

Conventional techniques for handling signal drift may include dynamically removing an offset from the sensor. However, damping systems on vehicles react (e.g., apply a damping force) on velocity. As a result, any offset (no matter how small) will generally lead to a velocity signal derived from the acceleration signal ramping to some value that is inaccurate (e.g., not real). This effect is illustrated in graph 510 of FIG. 5. For example, as shown, a velocity signal 512 that is derived from the acceleration signal (e.g., depicted in graph 500 of FIG. 5) ramps to an inaccurate velocity value during the first interval of time 504 and then, during the second interval of time 504, slowly returns to actual zero 502.

If a vehicle is traversing rolling hills in which the vehicle repeatedly drives up and down a slope, the signal drift in the velocity signal may be negligible. However, if the vehicle is driving up a slope for an extended period of time (e.g., for 10 miles), the signal drift in the velocity signal may con-tinuously increase. This may cause the velocity value derived from the acceleration signal output by the sensor on the vehicle to increase to a value that is not real. For example, if the actual body velocity of the vehicle is 0.5 meters per second and the drift is 0.5 meters per second, the sensed body velocity of the vehicle may be 1.0 meters per second.

As will now be discussed with reference to FIG. 6, example aspects of the present disclosure are directed to techniques for dynamically filtering body velocities of the vehicle to compensate for signal drift in the output (e.g., acceleration signal) of the sensor.

Figure 6:
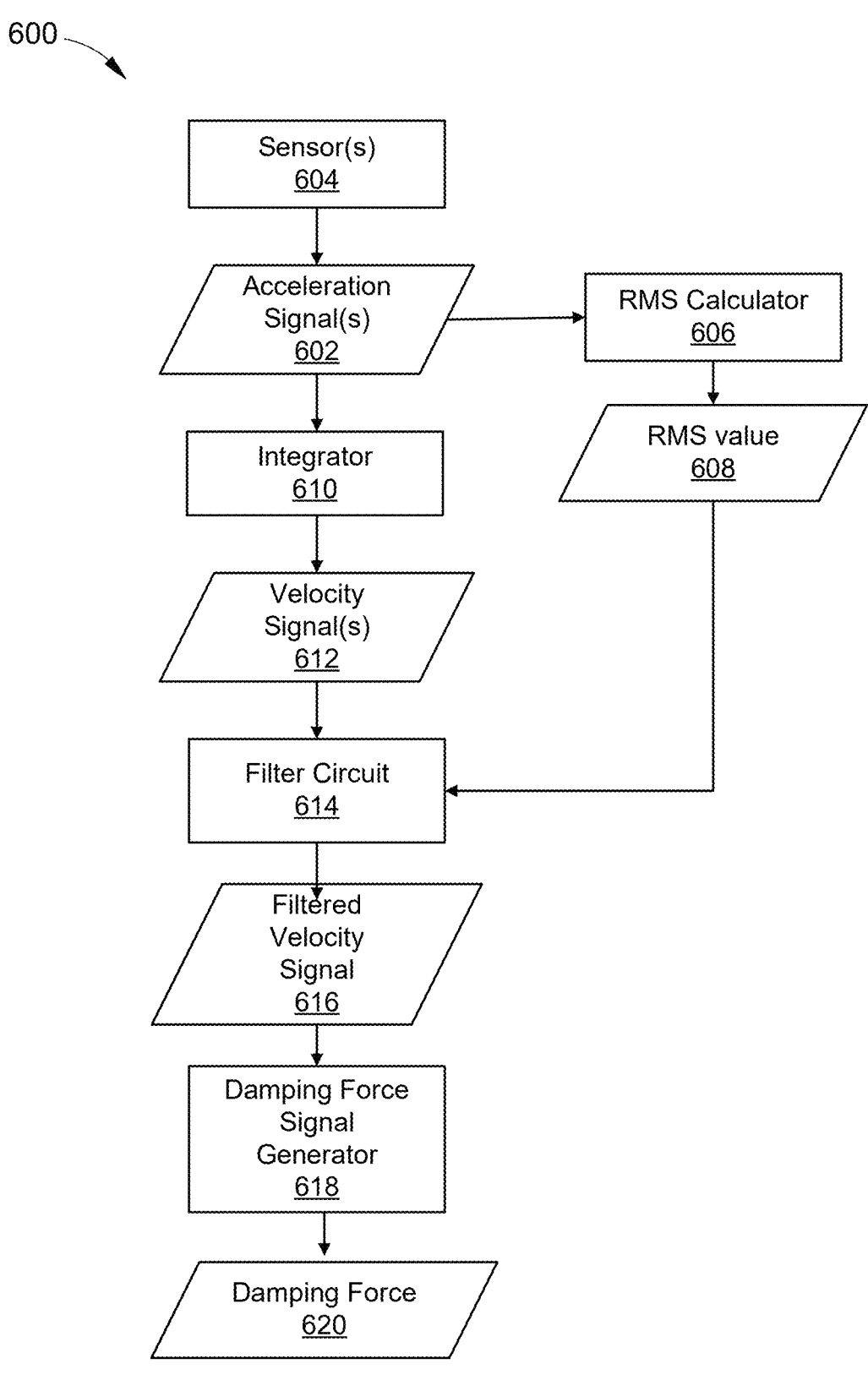
FIG. 6 illustrates a process for dynamically filtering body velocities by dynamically tuning a cutoff frequency of a high-pass filter in accordance with certain embodiments.

FIG. 6 depicts a process 600 for dynamically filtering body velocities of a vehicle according to some embodiments of the present disclosure. The process 600 may include obtaining acceleration data for the vehicle. For instance, in some embodiments, the acceleration data may include one or more acceleration signal(s) 602 obtained from one or more sensors 604 (e.g., inertial measurement unit(s)) onboard the vehicle). The acceleration signal(s) 602 may be indicative of acceleration of the body of the vehicle.

The process 600 may include providing the acceleration signal(s) 602 to a root-mean-square (RMS) calculator 606 configured to output an RMS value 608 of the acceleration signal(s) 602. By obtaining the RMS value 608 of the acceleration signal(s) 602, the energy content of the accel-eration signal(s) 602 may be determined. For example, the RMS value 608 may indicate how much heave energy there is in the vehicle.

The process 600 may further include providing the accel-eration signal(s) 602 to an integrator 610 configured to integrate the acceleration signal(s) 602 to obtain velocity signal(s) 612 that may be provided as an input to a filter circuit 614.

In some embodiments, the filter circuit 614 may include a high-pass filter and a low-pass filter. The high-pass filter may be tuned to a first cutoff frequency and the low-pass filter may be tuned to a second cutoff frequency that is lower than the first cutoff frequency. As will now be discussed, the cutoff frequency of the high-pass filter may be dynamically adjusted based on the energy content of the acceleration signal(s) 602 which, in some embodiments, may be the RMS value 608 output by the RMS calculator 606.

In some embodiments, the RMS value 608 output by the RMS calculator 606 may be compared to a threshold RMS value to determine whether the RMS value 608 indicates a primary ride event or a secondary ride event. As used herein, "primary ride events" refer to lower frequency, larger inputs. Examples of a primary ride event may include, without limitation, hitting a pothole or driving over a speed bump. As used herein, "secondary ride events" refer to higher fre-quency (e.g., 100 Hertz or greater), smaller inputs. An example of a secondary ride event may include hitting a rain click on a roadway at a significant speed (e.g., 80 miles per hour) such that the damping system cannot respond (e.g., apply a damping force) before the vehicle moves past the rain click and thus is no longer hitting the rain click.

Figure 7:
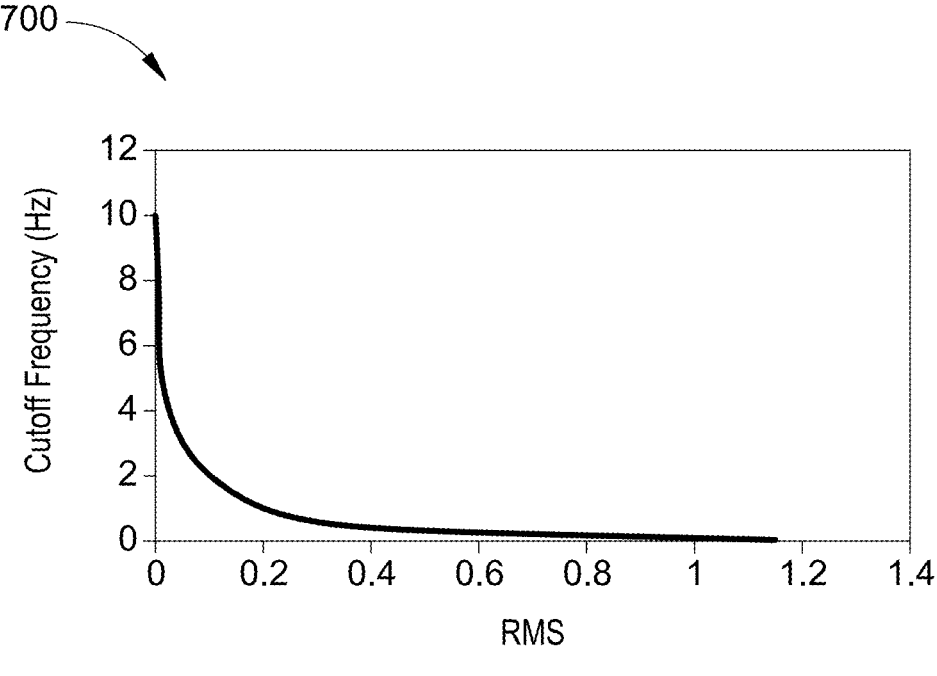
FIG. 7 illustrates a graph depicting a curve illustrating a relationship between a root-mean-square value of an acceleration signal and a cutoff frequency for a high-pass filter in accordance with certain embodiments.

In various embodiments, if the RMS value 608 is greater than the threshold RMS value, the RMS value 608 may be labeled as a primary ride event. Conversely, the RMS value 608 may be labeled as a secondary ride event if the RMS value 608 is less than the threshold RMS value. In some embodiments, the cutoff frequency of the high-pass filter may be adjustable from 0.001 Hertz to 50 Hertz. Furthermore, as illustrated in FIG. 7, the RMS value 608 and the cutoff frequency of the high-pass filter may be inversely proportional to one another. For example, as the RMS value increases (e.g., signaling greater energy content) the cutoff frequency of the high-pass filter decreases to accommodate proper filtering of the velocity signal(s) 612 indicative of the primary ride event and proper control of the damping system with regards to applying a damping force to compensate for the primary ride event.

For primary ride events, the high-pass filter of the filter circuit 614 is dynamically tuned to have a low cutoff frequency (e.g., about 0.001 Hertz) to ensure the peaks of the velocity signal(s) 612 indicating the sensed velocity of the body of the vehicle are aligned with corresponding peaks of velocity signal(s) indicating the actual velocity of the body of the vehicle. Aligning the peaks of these two velocity signals may allow the damping system to apply a damping force at an optimal time, such as when the dampers are moving in the correct direction. For secondary ride events, the high-pass filter of the filter circuit 614 may be dynamically tuned to have a high cutoff frequency (e.g., about 50 Hertz) to remove drift from the velocity signal(s) 612 and bring the velocity signal(s) 612 back to actual zero as quickly as possible.

The filter circuit 614 may output a filtered velocity signal 616 to a damping force signal generator 618. In some embodiments, the damping force signal generator 618 may be the damping controller 310 of the damping system 300 discussed above with reference to FIG. 3. The damping force signal generator 618 may be configured to output a damping force 620 to, for example, compensate for the primary ride event (e.g., driving over a pothole, driving over a speed bump) involving the vehicle.

As will now be discussed, the RMS value 608 of the acceleration signal(s) 602 may be used to perform other tasks. For instance, example aspects of the present disclosure are directed to determining different road surfaces (e.g., smooth road with undulations, rough road/broken pavement, or rough road with undulations) based on the RMS value 608 of the output (e.g., acceleration signal(s) 602) output by the sensor(s) 604 mounted to the vehicle.

In some embodiments, a RMS value of wheel-end velocities of the vehicle may be determined based on the RMS value 608. Furthermore, the energy content of the sprung mass as well as the unsprung mass may be determined using the RMS value of the wheel-end velocities of the vehicle. Then, based on the energy content of the sprung mass and the energy content of the unsprung mass, the type of road surface the vehicle is traversing may be determined.

In some embodiments, the energy content of the sprung mass being greater than the energy content of the unsprung mass may indicate that the vehicle is traversing a first type of road surface. More specifically, the first type of road surface that the vehicle is traversing may be a smooth road surface with undulations. In such embodiments, the damping system may be controlled to compensate for primary ride events, such as by decreasing the base current that is provided to the damper valves so that an adaptive current that is also provided to the damper valves has increased authority to handle primary ride events (e.g., by increasing the amplitude of the adaptive current to a maximum current value).

In some embodiments, the energy content of the unsprung mass being greater than the energy content of the sprung mass may indicate a second type of road surface that is different (e.g., rougher) compared to the first type of road surface. More specifically, the second type of road surface may be a rough road, such as broken pavement. In such embodiments, the damping system may be controlled to compensate for secondary ride events, such as by increasing the base current that is provided to the dampers valves so that the adaptive current that is also provided to the damper valves has less authority to handle primary ride events (e.g., by increasing the amplitude of the adaptive current to a value that is less than the maximum current value allowed for the adaptive current).

In some embodiments, the base current that is provided to each of the damper valves may be controlled based on the load of the vehicle. For instance, in some embodiments, sensors on the vehicle may indicate that a load on an axle (e.g. front axle) of the vehicle has increased from a first weight value (e.g., 100 pounds) to a second weight value (e.g., 200 pounds). In such embodiments, the base current that is being provided to the damper valves associated with at least the dampers at the front of the vehicle may be increased. In this manner, the damping system may prepare the dampers, specifically the front two dampers in this example, for when the vehicle sees an event (e.g., primary ride event). In some embodiments, a lookup table may indicate an amount by which the base current to the damper valves needs to be increased based, at least in part, on the increased weight of the vehicle.

In some embodiments, the damping system may be controlled to prevent the nose of the vehicle from pitching (e.g., lifting/dipping) when a driver accelerates aggressively from a stopped position or suddenly brakes to a full-stop. For instance, in some embodiments, the base current provided to the damper valves of the damping system may be increased immediately before aggressive acceleration or aggressive braking by the driver. For example, in some embodiments, the base current provided to the damper valves may be temporarily increased from a first value (e.g., 0.3 amps) to a second value (1.0 amps) in response to the speed of the vehicle exceeding a threshold speed (e.g., about 4 kilometers per hour) to compensate for a sudden acceleration of the vehicle. Additionally, the base current provided to the damper valves may be temporarily increased from the first value to the second value in response to the speed of the vehicle falling below the threshold speed to compensate for a sudden acceleration of the vehicle. In some embodiments, the amount of time for which the base current provided to the damper valves is increased may range from about 2 seconds to about 10 seconds, such as from about 2 seconds to about 5 seconds.

The above-described technique for eliminating (or at least minimizing) pitching of the vehicle caused by sudden acceleration or sudden braking may improve rider comfort. This is especially true for high center-of-gravity (COG) vehicles, such as pickup-trucks.

Figure 8:
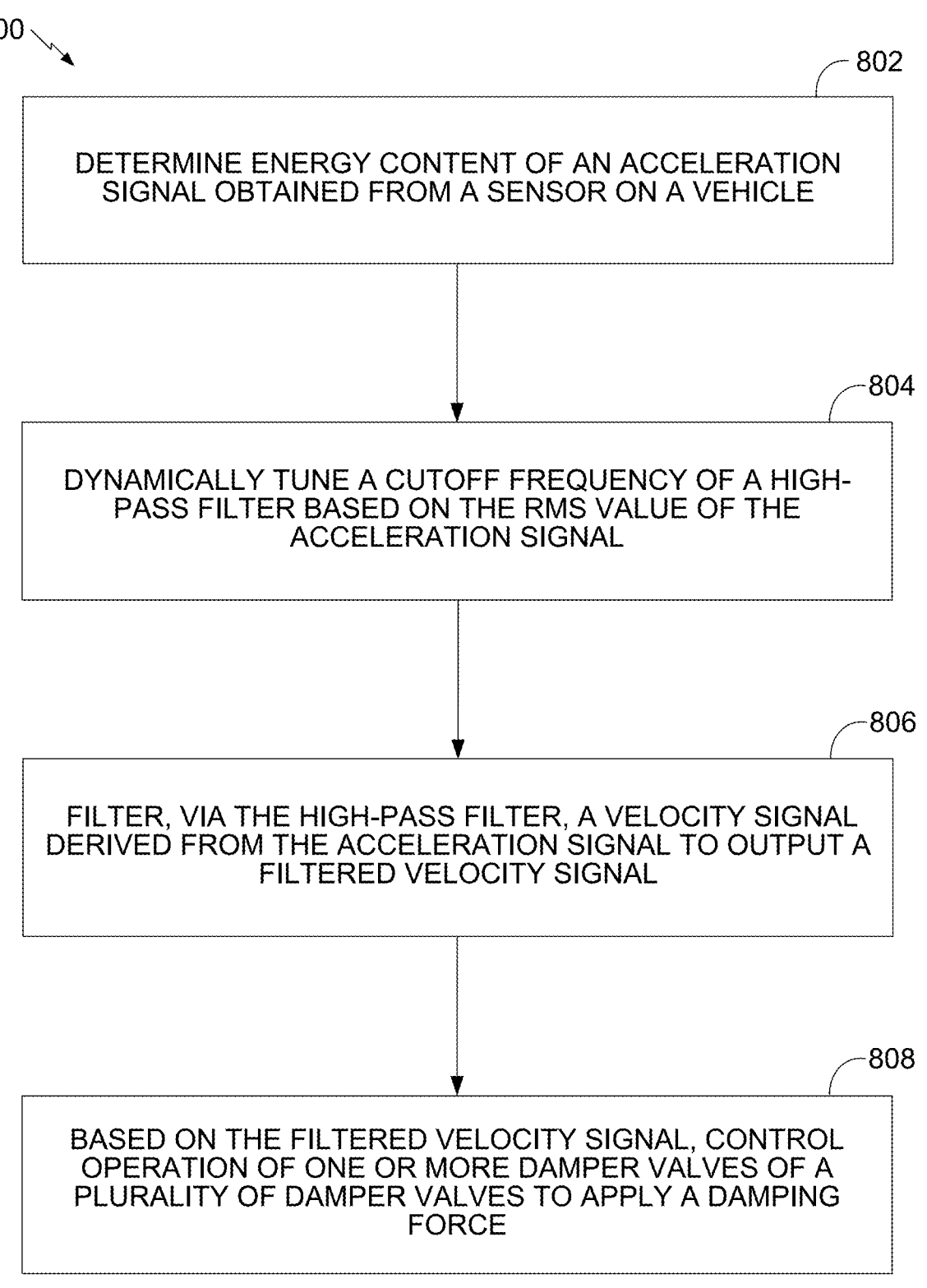
FIG. 8 illustrates a flow diagram of a method for dynamically filtering body velocities for a vehicle in accordance with certain embodiments.

FIG. 8 depicts a method 800 for dynamically filtering body velocities for a vehicle according to some embodiments of the present disclosure. The method 800 may be performed using the process 600 discussed above with reference to FIG. 6.

At 802, the method 800 may include determining energy content of an acceleration signal. For instance, the acceleration signal may be a heave acceleration signal, such as the acceleration signal depicted in graph 500 of FIG. 5. In some embodiments, determining the energy content of the acceleration signal may include determining a RMS value of the acceleration signal.

At 804, the method 800 may include dynamically tuning a cutoff frequency of a high-pass filter based on the RMS value of the acceleration signal. For instance, in some embodiments, dynamically tuning the cutoff frequency of the high-pass filter may include classifying, based on comparing the RMS value to a threshold RMS value, energy content of the acceleration signal as a primary ride event or a secondary ride event. In response to classifying the energy content of the acceleration signal as the primary ride event, the cutoff frequency may be tuned to a first cutoff frequency included in a range of cutoff frequencies. Alternatively, in response to classifying the energy content of the acceleration signal as the secondary ride event, the cutoff frequency may be tuned to a second cutoff frequency included in the range of cutoff frequencies. Furthermore, the second cutoff frequency may be higher than the first cutoff frequency.

At 806, the method 800 includes, subsequent to dynamically tuning the cutoff frequency of the high-pass filter, filtering, via the high-pass filter, a velocity signal derived from the acceleration signal to output a filtered velocity signal.

At 808, the method 800 includes, based on the filtered velocity signal, controlling operation of one or more damper valves of the plurality of a plurality of damper valves to apply a damping force.

FIG. 9 depicts a method 900 for non-linear body control of a vehicle according to some embodiments of the present disclosure. The method 900 may be performed using the process 400 discussed above with reference to FIG. 4.

At 902, the method 900 may include obtaining a velocity signal indicative of a velocity of the vehicle. For instance, an acceleration signal may be obtained from a sensor (e.g., IMU) onboard the vehicle and the velocity signal may derived from (e.g., by integrating) the acceleration signal.

At 904, the method 900 may include selecting a gain value to apply to the damping force output by the damping system based on the velocity of the vehicle, for example, by referencing a lookup table including a plurality of different velocity values and a plurality of different gain values associated with the different velocity values. Each respective gain value of the plurality of gain values may be assigned to a respective velocity value of the plurality of velocity values such that a non-linear relationship exists between the velocity values and the gain values.

At 906, the method 900 may include controlling operation of the damping system to apply the selected gain value to the damping force.

The descriptions of the various embodiments of the present disclosure have been presented for purposes of illustration. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure may exceed the specific described embodiments. Instead, any combination of the features and elements, whether related to different embodiments, is contemplated to implement and practice contemplated embodiments. Furthermore, although embodiments disclosed herein may achieve advantages over other possible solutions or over the prior art, the embodiments may achieve some advantages or no particular advantage. Thus, the aspects, features, embodiments and advantages discussed herein are merely illustrative.

While the foregoing is directed to embodiments of the present disclosure, other and further embodiments may be devised without departing from the basic scope thereof, and the scope thereof is determined by the claims that follow.

What is claimed is:

1. A vehicle, comprising:
   a suspension system comprising a damping system including a plurality of dampers and a plurality of damper valves; and
   one or more processors configured to:
      determine energy content of an acceleration signal indicative of acceleration of the vehicle;
      dynamically tune a cutoff frequency of a high-pass filter based on the energy content of the acceleration signal;
      filter, via the high-pass filter, a velocity signal derived from the acceleration signal to output a filtered velocity signal; and
      control operation of the damping system based on the filtered velocity signal.

2. The vehicle of claim 1, wherein determining the energy content of the acceleration signal comprises determining a root-mean-square (RMS) value of the acceleration signal.

3. The vehicle of claim 2, wherein dynamically tuning the cutoff frequency of the high-pass filter comprises:
   classifying, based on comparing the RMS value to a threshold RMS value, energy content of the acceleration signal as a primary ride event or a secondary ride event; and
   responsive to classifying the energy content of the acceleration signal as the primary ride event, dynamically tuning the cutoff frequency to a first cutoff frequency included in a range of cutoff frequencies, or
   responsive to classifying the energy content of the acceleration signal as the secondary ride event, dynamically tuning the cutoff frequency to a second cutoff frequency included in the range of cutoff frequencies, wherein the second cutoff frequency is higher than the first cutoff frequency.

4. The vehicle of claim 3, wherein the range of cutoff frequencies is about 0.001 Hertz (Hz) to about 50 Hz.

5. The vehicle of claim 4, wherein:
   the first cutoff frequency corresponding to the primary ride event is about 0.001 Hz; and
   the second cutoff frequency corresponding to the secondary ride event is about 50 Hz.

6. The vehicle of claim 1, wherein controlling operation of the damping system based on the filtered velocity signal comprises adjusting an input current provided to one or more dampers of the plurality of dampers.

7. The vehicle of claim 2, wherein the one or more processors are further configured to:
   determine a RMS value of one or more wheel-end velocities of the vehicle based on the RMS value of the acceleration signal;
   determine a RMS value of a sprung mass of the vehicle;
   determine a RMS value of an unsprung mass of the vehicle;

classify a road surface based on the RMS value of the sprung mass and the RMS value of the unsprung mass; and control operation of the damping system based on the classified road surface.

8. The vehicle of claim 7, wherein:

when the road surface is classified as a first type of road surface, controlling operation of the damping system comprises reducing a base current provided to one or more damper valves of the plurality of damper valves; and when the road surface is classified as a second type of road surface that is different from the first type of road surface, controlling operation of the damping system comprises increasing a base current provided to the one or more damper valves.

9. The vehicle of claim 1, wherein the one or more processors are further configured to:

determine a load on an axle of the vehicle has increased by a threshold amount; and based on the load on the axle increasing by the threshold amount, increasing a current provided to one or more damper valves of the plurality of damper valves.

10. The vehicle of claim 1, wherein the one or more processors are further configured to:

determine a speed of the vehicle has exceeded a threshold speed; and based on the speed of the vehicle exceeding the threshold speed, increasing a base current provided to one or more damper valves of the plurality of damper valves for a duration of time.

11. The vehicle of claim 1, wherein the one or more processors are further configured to:

determine a speed of the vehicle has fallen below a threshold speed; and based on the speed of the vehicle falling below the threshold speed, increase a base current provided to one or more damper valves of the plurality of damper valves for a duration of time.

12. The vehicle of claim 1, wherein:

the one or more processors are further configured to determine a gain value based on the filtered velocity signal; and controlling operation of the damping system based on the filtered velocity signal comprises generating a damping force having the determined gain value.

13. The vehicle of claim 12, wherein determining the gain value comprises selecting, from a lookup table, a gain value corresponding to a velocity value associated with the filtered velocity signal, the lookup table comprising a plurality of velocity values and associated gain values.

14. A method for dynamically filtering body velocities for a vehicle, comprising:

determining energy content an acceleration signal indicative of acceleration of the vehicle;

dynamically tuning a cutoff frequency of a high-pass filter based on the energy content of the acceleration signal;

filtering, via the high-pass filter, a velocity signal derived from the acceleration signal to output a filtered velocity signal; and controlling operation of a damping system based on the filtered velocity signal.

15. The method of claim 14, wherein determining the energy content of the acceleration signal comprises determining a root-mean-square (RMS) value of the acceleration signal.

16. The method of claim 15, wherein dynamically tuning the cutoff frequency of the high-pass filter comprises:

classifying, based on comparing the RMS value to a threshold RMS value, energy content of the acceleration signal as a primary ride event or a secondary ride event; and responsive to classifying the energy content of the acceleration signal as the primary ride event, dynamically tuning the cutoff frequency to a first cutoff frequency included in a range of cutoff frequencies, or responsive to classifying the energy content of the acceleration signal as the secondary ride event, dynamically tuning the cutoff frequency to a second cutoff frequency included in the range of cutoff frequencies, wherein the second cutoff frequency is higher than the first cutoff frequency.

17. The method of claim 15, further comprising:

determining a RMS value of one or more wheel-end velocities of the vehicle based on the RMS value of the acceleration signal;

determining a RMS value of a sprung mass of the vehicle;

determining a RMS value of an unsprung mass of the vehicle;

classifying a road surface based on the RMS value of the sprung mass and the RMS value of the unsprung mass; and controlling operation of the damping system based on the classified road surface.

18. The method of claim 17, wherein:

when the road surface is classified as a first type of road surface, controlling operation of the damping system comprises reducing a base current provided to one or more damper valves of a plurality of damper valves of the damping system; and when the road surface is classified as a second type of road surface that is different from the first type of road surface, controlling operation of the damping system comprises increasing a base current provided to the one or more damper valves.

19. The method of claim 14, further comprising:

determining a load on an axle of the vehicle has increased by a threshold amount; and based on the load on the axle increasing by the threshold amount, increasing a current provided to one or more damper valves of a plurality of damper valves of the damping system.

20. A vehicle comprising:

a suspension system comprising a damping system configured to output a damping force; and one or more processors configured to:

obtain a velocity signal indicative of a velocity of the vehicle;

select, via a lookup table, a gain value to apply to the damping force based on the velocity of the vehicle, the lookup table including a plurality of different velocity values and a plurality of different gain values, each respective gain value of the plurality of gain values assigned to a respective velocity value of the plurality of velocity values such that a non-linear relationship exists between the velocity values and the gain values; and control operation of the damping system to apply the selected gain value to the damping force.

* * * * *